(12) United States Patent
Kitaji et al.

(10) Patent No.: US 9,882,446 B2
(45) Date of Patent: Jan. 30, 2018

(54) MOTOR

(71) Applicant: Nidec Corporation, Kyoto (JP)

(72) Inventors: Kazuya Kitaji, Kyoto (JP); Keizo Furukawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 782 days.

(21) Appl. No.: 14/318,915

(22) Filed: Jun. 30, 2014

(65) Prior Publication Data

US 2015/0008784 A1 Jan. 8, 2015

(30) Foreign Application Priority Data

Jul. 2, 2013 (JP) .................................. 2013-139027
Jul. 2, 2013 (JP) .................................. 2013-139028
Jan. 14, 2014 (JP) .................................. 2014-004545

(51) Int. Cl.
*H02K 3/38* (2006.01)
*H02K 3/48* (2006.01)
(Continued)

(52) U.S. Cl.
CPC ............... *H02K 3/345* (2013.01); *H02K 3/34* (2013.01); *H02K 3/522* (2013.01); *H02K 5/08* (2013.01);
(Continued)

(58) Field of Classification Search
CPC ............ H02K 3/32; H02K 3/325; H02K 3/34; H02K 3/345; H02K 3/38; H02K 3/52;
(Continued)

(56) References Cited

U.S. PATENT DOCUMENTS 4,495,450 A 1/1985 Tokizaki et al.
5,006,744 A 4/1991 Archer et al.
(Continued)

FOREIGN PATENT DOCUMENTS

JP 56-156353 U1 11/1981
JP 57-139284 U 8/1982
(Continued)

OTHER PUBLICATIONS

Kitaji et al.; "Motor"; U.S. Appl. No. 14/299,112, filed Jun. 9, 2014.
(Continued)

*Primary Examiner* — Tran Nguyen
(74) *Attorney, Agent, or Firm* — Keating & Bennett, LLP

(57) ABSTRACT

A motor includes an armature arranged radially outside a rotor magnet, and a casing configured to fix the armature and hold upper and lower bearings configured to rotatably support a shaft at a radial center thereof. The armature includes a stator core, an insulator arranged to cover the stator core, coils each of which is defined by a conducting wire wound around a separate one of magnetic pole teeth with the insulator intervening therebetween, and passage lines each of which is arranged circumferentially between adjacent ones of the magnetic pole teeth to electrically connect one of the coils and another one of the coils with each other. The insulator includes magnetic pole tooth insulating portions arranged to cover a separate one of the magnetic pole teeth; and a core back insulating portion integral with each magnetic pole tooth insulating portion.

12 Claims, 12 Drawing Sheets

(51) Int. Cl.
H02K 3/34 (2006.01)
H02K 5/16 (2006.01)
H02K 3/52 (2006.01)
H02K 5/08 (2006.01)
H02K 5/15 (2006.01)
H02K 5/173 (2006.01)

(52) U.S. Cl.
CPC ............... H02K 5/15 (2013.01); H02K 5/161 (2013.01); H02K 5/1732 (2013.01); H02K 5/1735 (2013.01)

(58) Field of Classification Search
CPC .......... H02K 3/522; H02K 5/22; H02K 5/225; H02K 11/00; H02K 11/01; H02K 11/33; H02K 11/40; H02K 29/00
USPC ........ 310/71, 88, 89, 194, 214–215, 216.115
See application file for complete search history.

(56) References Cited

U.S. PATENT DOCUMENTS

| | | | |
|---|---|---|---|
| 5,173,814 A * | 12/1992 | Elsasser | G11B 17/038 360/98.07 |
| 8,378,540 B2 | 2/2013 | Furukawa et al. | |
| 2007/0273221 A1 * | 11/2007 | Kinoshita | H02K 3/50 310/58 |
| 2009/0224626 A1 | 9/2009 | Eppler et al. | |

FOREIGN PATENT DOCUMENTS

| | | |
|---|---|---|
| JP | 62-111760 U | 7/1987 |
| JP | 63-194551 U | 12/1988 |
| JP | 06-233513 A | 8/1994 |
| JP | 11-355996 A | 12/1999 |
| JP | 2001-332013 A | 11/2001 |
| JP | 2002-136056 A | 5/2002 |
| JP | 2003-274579 A | 9/2003 |
| JP | 2007-135357 A | 5/2007 |
| JP | 2007-143295 A | 6/2007 |
| JP | 2007-166851 A | 6/2007 |
| JP | 2007-236180 A | 9/2007 |
| JP | 2008-011650 A | 1/2008 |
| JP | 2008-178204 A | 7/2008 |
| JP | 2009-296809 A | 12/2009 |
| JP | 2012-67659 A | 4/2012 |

OTHER PUBLICATIONS

Furukawa et al.; "Motor"; U.S. Appl. No. 14/318,907, filed Jun. 30, 2014.

* cited by examiner

MOTOR

BACKGROUND OF THE INVENTION

1. Field of the Invention

The present invention relates to an inner-rotor motor.

2. Description of the Related Art

In recent years, there has been a demand for small-sized and high-power inner-rotor motors.

In order to increase power of the motor, it is necessary to increase the number of laminated magnetic steel sheets of an armature, or to increase the thickness of a conducting wire.

In a motor described in JP-A 11-220860, a fixing screw 7 is passed through a ring-shaped stator 1 in an axial direction, and this fixing screw 7 is used to fasten cover members 5 and 6 to the ring-shaped stator 1.

Meanwhile, in a motor described in JP-A 2001-136699, a metallic part having a high thermal conductivity, such as a screw 9, a rivet 10, or a burr 11, is passed through a hole 8 to attach a stator core 13 to a base 16. At this time, a raised portion 17 or an insulator 14, which is made of an insulating material, is arranged between the metallic part and a conducting wire 5 to prevent a contact between the metallic part and the conducting wire 5.

An increase in the number of laminated magnetic steel sheets of the armature results in increased power of the motor. Also, an increase in the thickness of the conducting wire allows an increased amount of current to pass therethrough. However, both the increase in the number of laminated magnetic steel sheets of the armature and the increase in the thickness of the conducting wire conflict with a demand for a reduction in the thickness of the motor.

SUMMARY OF THE INVENTION

Preferred embodiments of the present invention provide an inner-rotor motor having a structure which overcomes the problems of the above-described techniques.

A motor according to a preferred embodiment of the present invention includes a bearing portion including an upper bearing and a lower bearing; a shaft including a central axis extending in a vertical direction as a center thereof, and rotatably supported by the bearing portion; a rotor magnet configured to rotate together with the shaft; an armature arranged radially outside the rotor magnet; and a casing configured to fix the armature and hold the upper and lower bearings at a radial center thereof, the upper and lower bearings being configured to rotatably support the shaft. The armature includes a stator core including an annular core back and a plurality of magnetic pole teeth arranged to project radially inward from the core back; an insulator arranged to cover at least an upper surface and a lower surface of each of the magnetic pole teeth of the stator core; coils each of which is defined by a conducting wire wound around a separate one of the plurality of magnetic pole teeth with the insulator intervening therebetween; and passage lines, each of which is arranged circumferentially between adjacent ones of the magnetic pole teeth to electrically connect one of the coils and another one of the coils with each other. The insulator includes magnetic pole tooth insulating portions each of which is arranged to cover a separate one of the plurality of magnetic pole teeth; and a core back insulating portion integral with each of the magnetic pole tooth insulating portions, and arranged to cover at least portions of upper and lower end surfaces of the core back. The core back insulating portion includes a plurality of passage line guide walls each of which is arranged to project in an axial direction away from a surface covering the core back between the casing and at least one of the passage lines; a plurality of passage line holding portions each of which is arranged to project in the axial direction away from the surface covering the core back, and each of which is configured to support at least one of the passage lines with a radially outer surface thereof radially inside a separate one of the passage line guide walls; and a plurality of coil guide walls each of which is arranged to project in the axial direction away from the surface covering the core back, and each of which is arranged radially opposite a radially outer side of a corresponding one of the coils radially outside a corresponding one of the magnetic pole teeth. An upper end of a portion of each passage line guide wall which is radially opposed to a corresponding one of the passage line holding portions is arranged at a level lower than that of an upper end of the corresponding passage line holding portion.

A motor according to another preferred embodiment of the present invention includes a bearing portion including an upper bearing and a lower bearing; a shaft including a central axis extending in a vertical direction as a center thereof, and rotatably supported by the bearing portion; a rotor magnet configured to rotate together with the shaft; an armature arranged radially outside the rotor magnet; a casing configured to fix the armature and hold the upper and lower bearings at a radial center thereof, the upper and lower bearings being configured to rotatably support the shaft; and a cover member. The armature includes a stator core including an annular core back and a plurality of magnetic pole teeth arranged to project radially inward from the core back; an insulator arranged to cover at least an upper surface and a lower surface of each of the plurality of magnetic pole teeth of the stator core; and coils each of which is defined by a conducting wire wound around a separate one of the plurality of magnetic pole teeth with the insulator intervening therebetween. The casing includes an opening portion defined by a through hole passing through an axial end surface of the casing in the axial direction. The cover member is arranged opposite to the opening portion between the casing and the armature.

The preferred embodiments of the present invention contribute to reducing the thickness of an insulator, and in turn to reducing the thickness of a motor or increasing power of the motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction in which a central axis of a motor extends, and that a side on which a circuit board is arranged with respect to a stator core is defined as an upper side. The shape of each member or portion and relative positions of different members or portions will be described based on the above assumptions. It should be noted, however, that the above definitions of the vertical direction and the upper and lower sides are made simply for the sake of convenience in description, and should not be construed to restrict in any way the orientation of a motor according to any preferred embodiment of the present invention when in use.

A motor 1 according to the present preferred embodiment of the present invention is preferably, for example, installed in a household electrical appliance, such as an air conditioner, an air purifier, or a refrigerator, and is used as a driving source of a fan or a pump. Alternatively, the motor 1 according to the present preferred embodiment may be used as a driving source of industrial equipment, such as a sorter. Note that motors according to other preferred embodiments of the present invention may be used for other purposes. For example, motors according to other preferred embodiments of the present invention may be installed in an office automation appliance, a medical appliance, an automobile, and the like, and be used to generate a variety of driving forces, if so desired. Hereinafter, a device in which the motor 1 is installed is referred to as a "drive apparatus".

Figure 1:
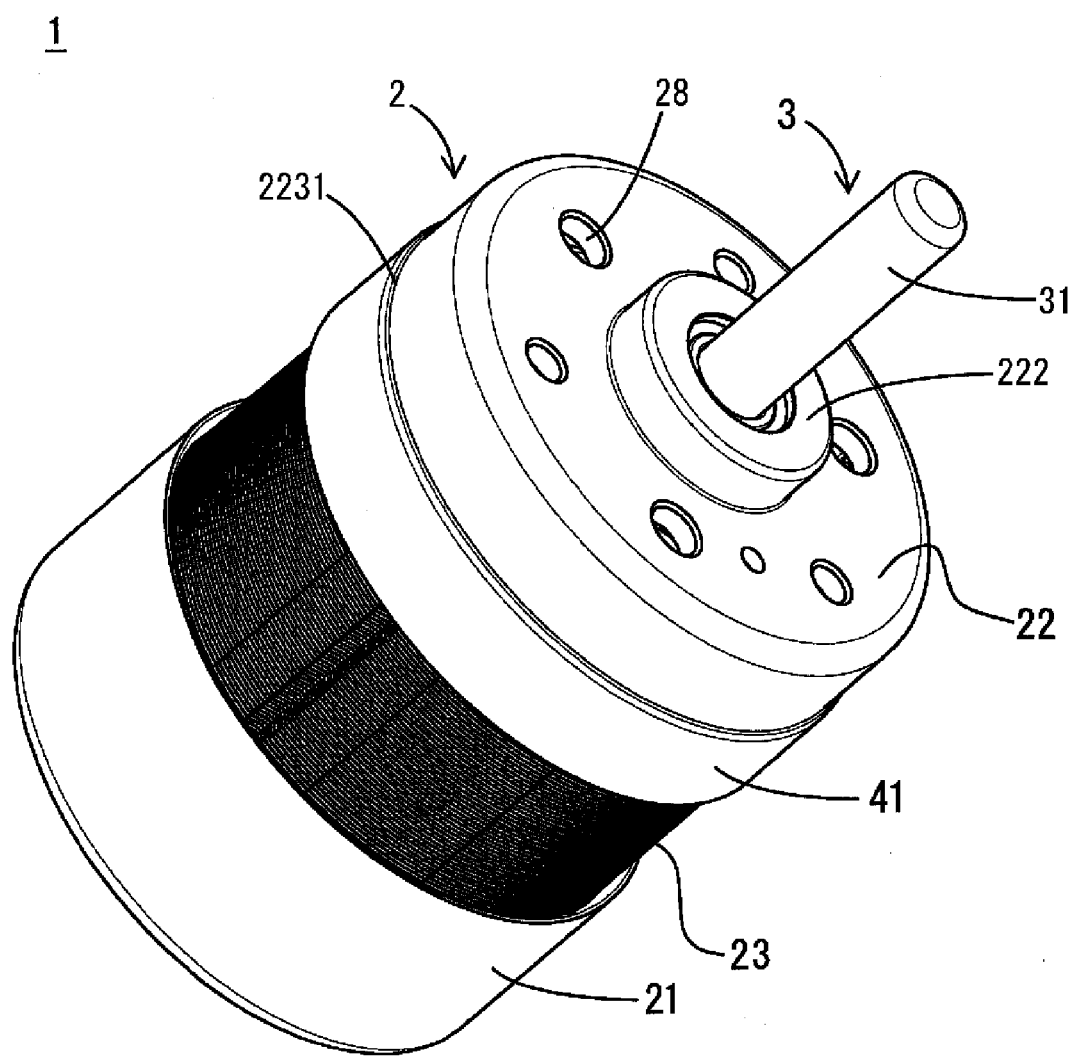
FIG. 1 is a perspective view of an external appearance of a motor according to a preferred embodiment of the present invention.
Figure 2:
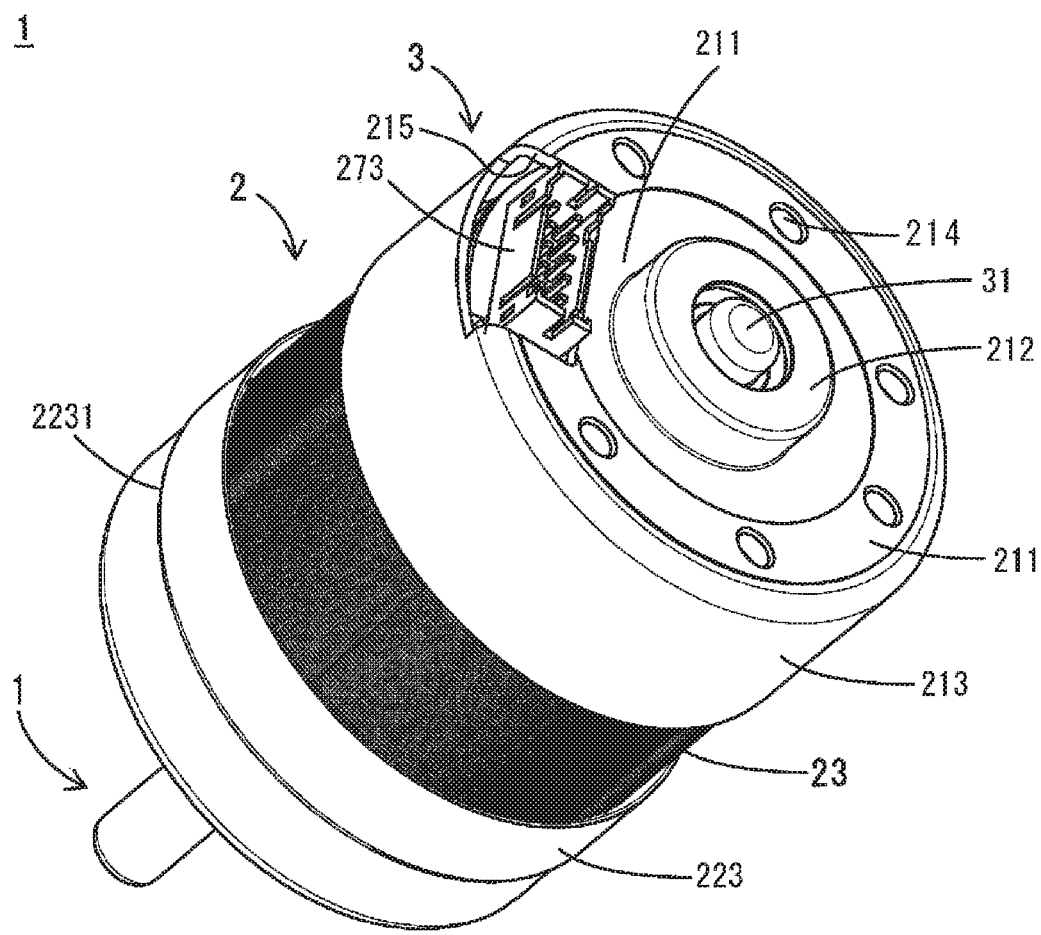
FIG. 2 is a perspective view of the external appearance of the motor.
Figure 3:
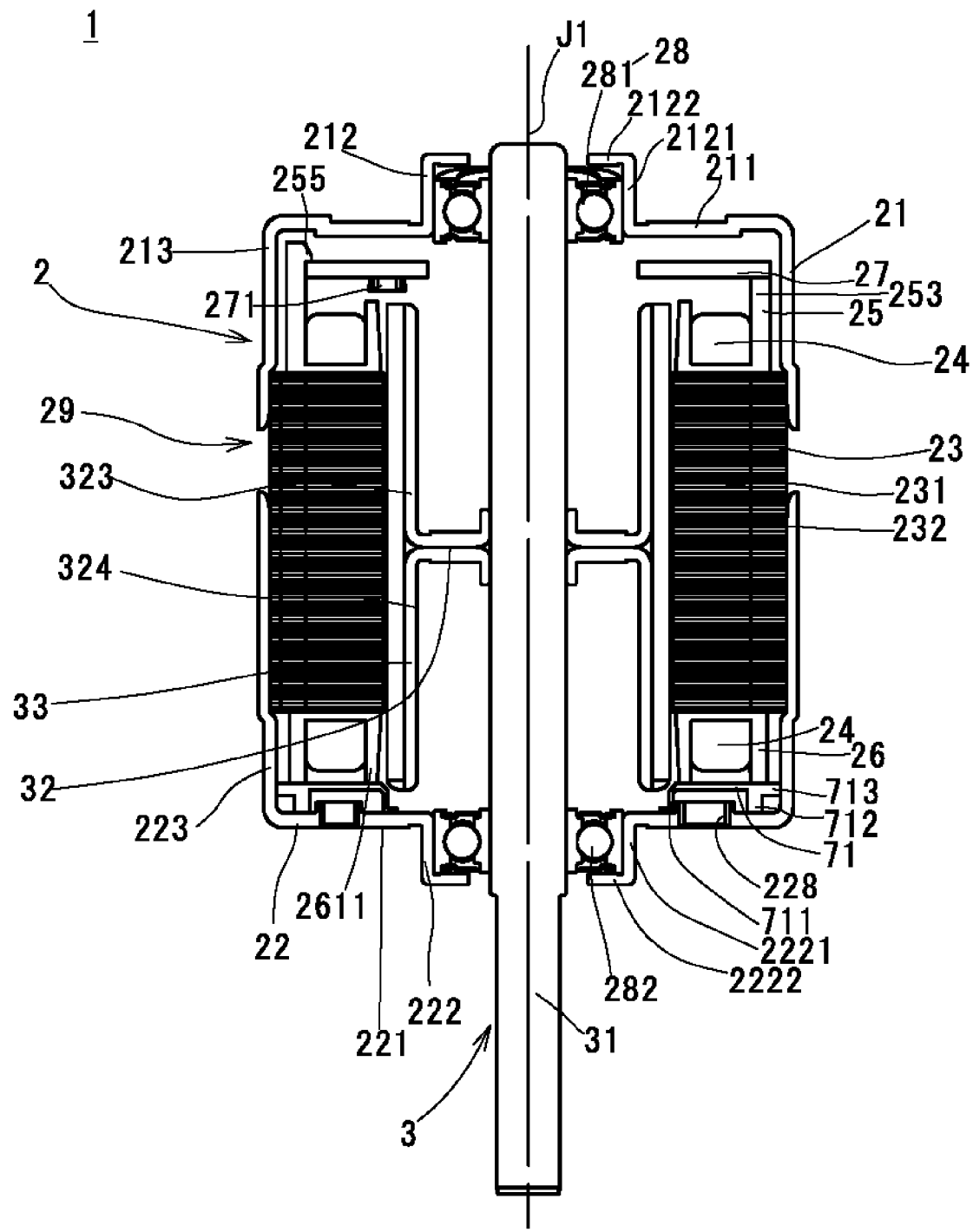
FIG. 3 is a cross-sectional view of the motor.

FIGS. 1 and 2 are each a perspective view of an external appearance of the motor 1 according to the present preferred embodiment. FIG. 3 is a cross-sectional view of the motor 1. Referring to FIGS. 1, 2, and 3, the motor 1 includes a stationary portion 2 and a rotating portion 3. The stationary portion 2 is fixed to a frame of the drive apparatus (not shown). The rotating portion 3 is supported to be rotatable with respect to the stationary portion 2.

The stationary portion 2 according to the present preferred embodiment preferably includes an upper bracket 21, a lower bracket 22, a stator core 23, coils 24, an upper insulator 25, a lower insulator 26, a circuit board 27, and a bearing portion 28.

The upper bracket 21 is configured to hold the stator core 23 and the bearing portion 28 (more specifically, an upper bearing 281). The upper bracket 21 is in or substantially in the shape of a covered cylinder. The upper bracket 21 is preferably made of a metal. The upper bracket 21 is preferably obtained by so-called press working, that is, by stamping a steel sheet for shaping. Note that the upper bracket 21 may not necessarily be produced by the press working, but may be processed by another processing method, such as, for example, a die-casting process. Also note that the upper bracket 21 may not necessarily be made of the metal, but may alternatively be made of a resin.

The lower bracket 22 is configured to hold the stator core 23 and the bearing portion 28 (more specifically, a lower bearing 282). The lower bracket 22 includes a bottom and is cylindrical or substantially cylindrical in shape. The lower bracket 22 is preferably made of a metal.

The lower bracket 22 is preferably obtained by the so-called press working, that is, by stamping a steel sheet for shaping. Note that the lower bracket 22 may not necessarily be produced by the press working, but may be processed by another processing method, such as, for example, the die-casting process. Also note that the lower bracket 22 may not necessarily be made of the metal, but may be alternatively made of a resin. In the present preferred embodiment, the stator core 23 and the lower bearing 282 are held by the lower bracket 22 which is preferably defined by a single monolithic member. This makes it possible to position the stator core 23 and a shaft 31 described below relative to each other with high precision.

The stator core 23 and the coils 24 function as an armature of the motor 1. The stator core 23 is defined by laminated steel sheets, that is, electromagnetic steel sheets, such as, for example, silicon steel sheets, placed one upon another in an axial direction. The axial direction is herein assumed to be a direction parallel or substantially parallel to a central axis J1 of the motor 1. The stator core 23 preferably includes an annular core back 231 and a plurality of magnetic pole teeth 232 configured to project radially inward from the core back 231. The core back 231 is held by the upper and lower brackets 21 and 22 by being held between the upper and lower brackets 21 and 22. An outer circumferential surface of the core back 231, except an axially upper portion and an axially lower portion thereof, defines a portion of an outer circumferential surface of the motor 1. A portion of each magnetic pole tooth 232 of the stator core 23 around which a corresponding one of the coils 24 is wound is configured to have a circumferential width equal to or smaller than twice the radial width of the core back 231. In the present preferred embodiment, the number of magnetic pole teeth 232 preferably is six, for example.

Here, an outer circumferential surface of the stator core 23, except near an upper end and a lower end thereof, is not covered with the upper and lower brackets 21 and 22, so that a portion of the outer circumferential surface of the stator core 23 is exposed from the upper and lower brackets 21 and 22. That is, according to the present preferred embodiment, a total area over which the outer circumferential surface of the stator core 23 is radially opposed to the upper bracket 21 or the lower bracket 22 is reduced compared to the case where the entire outer circumferential surface of the stator core 23 is covered with the upper and lower brackets 21 and 22. Accordingly, even if each of the upper and lower brackets 21 and 22 is a magnetic body, a leakage of magnetic flux from the outer circumferential surface of the stator core 23 to the upper and lower brackets 21 and 22 is less likely to occur. Thus, a reduction in a core loss due to the upper and lower brackets 21 and 22 is achieved, and an improvement in an energy efficiency of the motor 1 is achieved.

The stator core 23 preferably includes through holes 233 defined at boundaries between the core back 231 and some of the magnetic pole teeth 232. In the present preferred embodiment, the number of through holes 233 preferably is three, for example. The through holes 233 are preferably arranged at regular or substantially regular intervals in a circumferential direction with the central axis J1 as a center. In the present preferred embodiment, the through holes 233 are preferably arranged at regular intervals of 120 degrees with the central axis J1 as the center, for example. Note that the through holes 233 as described above are not essential to the present invention, but may be replaced with grooves, notches, recesses, etc., each of which is recessed radially inward.

The outer circumferential surface of the stator core 23 preferably includes vertical grooves each of which extends in the axial direction. Projecting portions of the upper bracket 21 and projecting portions of the lower bracket 22 are inserted or fitted into the vertical grooves. As a result, each of the upper and lower brackets 21 and 22 is positioned radially and circumferentially.

Each coil 24 is defined by a conducting wire wound around a separate one of the magnetic pole teeth 232. The coil 24 is wound around the magnetic pole tooth 232 with an insulator intervening therebetween. In the present preferred embodiment, the conducting wires are connected in a so-called star configuration. Therefore, four end portions of the conducting wires used for a U phase, a V phase, a W phase, and common, respectively, are drawn out from the coils 24. Each of the drawn-out end portions is soldered to the circuit board 27. Once drive currents are supplied to the coils 24 through the circuit board 27, radial magnetic flux is generated around each of the magnetic pole teeth 232, each of which is a magnetic core. Then, interaction between the magnetic flux of the magnetic pole teeth 232 and that of a rotor magnet 33 included in the rotating portion 3 produces a circumferential torque, so that the rotating portion 3 is caused to rotate about the central axis J1 with respect to the stationary portion 2.

The insulator includes the upper and lower insulators 25 and 26. Each of the upper and lower insulators 25 and 26 is preferably a member made of a resin and configured to provide electrical isolation between the stator core 23 and each coil 24. The upper insulator 25 is arranged above the stator core 23. The lower insulator 26 is arranged below the stator core 23. In other words, the stator core 23 is held between the upper and lower insulators 25 and 26. The upper insulator 25 is configured to cover an upper surface of each magnetic pole tooth 232. The lower insulator 26 is configured to cover a lower surface of each magnetic pole tooth 232. Moreover, the upper and lower insulators 25 and 26 are configured to together cover side surfaces of each magnetic pole tooth 232. The upper and lower insulators 25 and 26 together define the insulator. In the present preferred embodiment, the coils 24 are wound around the respective magnetic pole teeth 232 with the upper and lower insulators 25 and 26 intervening therebetween, so that the insulator is fixed to the stator core 23.

Each of the upper and lower insulators 25 and 26 includes portions arranged to intervene between the magnetic pole teeth 232 and the coils 24 to provide electrical isolation between the magnetic pole teeth 232 and the coils 24. In addition, the upper insulator 25 includes an annular core back insulating portion 252 extending continuously in the circumferential direction radially outside the coils 24. The core back insulating portion 252 is arranged radially outside the coils 24. The core back insulating portion 252 is a portion configured to provide isolation between each coil 24 and another member if a collapse of the coil 24 should happen. An assembly made up of the stator core 23, the coils 24, the upper insulator 25, and the lower insulator 26 is defined as an armature 29. Each of the upper and lower insulators 25 and 26 will be described in detail below.

Figure 4:
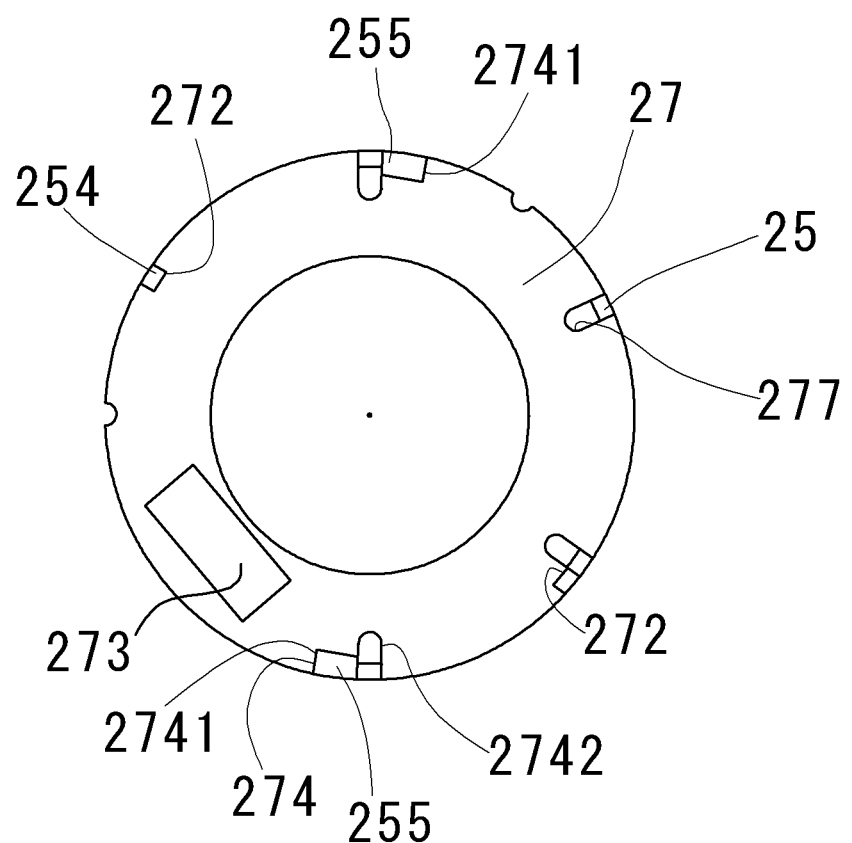
FIG. 4 is a plan view of the motor with an upper bracket removed from the motor.

FIG. 4 is a plan view of the motor 1 according to the present preferred embodiment with the upper bracket 21 removed from the motor 1. Referring to FIG. 4, the circuit board 27 is preferably a board on which a wiring is configured to supply the drive currents from an external power supply to the coils 24. The circuit board 27 is in or substantially in the shape of a disk in a plan view. The outside diameter of the circuit board preferably is equal or substantially equal to that of the upper insulator 25, which will be described below. The circuit board 27 is fixed onto a seating surface included in an upper surface of the upper insulator 25. In addition, a magnetic sensor 271 configured to detect a rotation rate of the rotating portion 3 is preferably arranged on a lower surface of the circuit board 27. A Hall element, for example, is preferably used as the magnetic sensor 271.

Referring to FIG. 3, the bearing portion 28 is a member configured to rotatably support the shaft 31 of the rotating portion 3. The bearing portion 28 is preferably defined by the upper and lower bearings 281 and 282. The upper bearing 281 is held by an inner circumferential surface 2121 of a holding portion 212 of the upper bracket 21. The lower bearing 282 is preferably held by the lower bracket 22. Ball bearings, each of which causes an outer race and an inner race to rotate relative to each other through balls, are used as the bearing portion 28, for example. Note that a bearing of another type, such as a plain bearing, a fluid bearing, or the like, may be alternatively used as the bearing portion 28.

The rotating portion 3 according to the present preferred embodiment includes the shaft 31, a rotor holder 32, and the rotor magnet 33. The shaft 31 is a columnar or substantially columnar member configured to extend in the vertical direction along the central axis J1. The shaft 31 is configured to rotate about the central axis J1 while being supported by the above-described bearing portion 28. A lower end portion of the shaft 31 is configured to project downward below the lower bracket 22. Meanwhile, an upper end portion of the shaft 31 is configured to project upward above the circuit board 27. One of the lower end portion and the upper end portion of the shaft 31 is preferably joined to a driving portion of the drive apparatus through a power transmission mechanism, such as, for example, a gear. Note that the driving portion of the drive apparatus may be directly driven by the shaft 31.

The rotor holder 32 is a member configured to rotate together with the shaft 31 radially inside the stator core 23 and the coils 24. The rotor holder 32 according to the present preferred embodiment is defined by a combination of an upper rotor holder member 323 and a lower rotor holder member 324, each of which includes a bottom and is cylindrical or substantially cylindrical in shape, arranged back to back. That is, a bottom surface of the upper rotor holder member 323 and a bottom surface of the lower rotor holder member 324 are arranged opposite to each other with a minute gap intervening therebetween. Each of the upper and lower rotor holder members 323 and 324 is preferably obtained by the so-called press working, that is, by stamping a steel sheet for shaping.

Although, in the present preferred embodiment, the rotor holder 32 is defined by the combination of the upper and lower rotor holder members 323 and 324 arranged back to back, this is not essential to the present invention. The rotor holder 32 may alternatively be defined by a single monolithic member, if so desired. Also, the rotor holder 32 may be obtained by subjecting a free-cutting steel to a cutting process, for example. Also, the rotor holder 32 may be defined by laminated magnetic steel sheets. Also, the rotor holder 32 may be produced by sintering. Also, the rotor holder 32 may be produced by combining a component defined by laminated magnetic steel sheets and a component substantially in the shape of a covered cylinder and produced by press working. Also, the rotor holder 32 may be produced by resin molding. A rotor according to the present preferred embodiment is preferably a rotor of a so-called SPM (Surface Permanent Magnet) type, but this is not essential to the present invention. A rotor of a so-called IPM (Interior Permanent Magnet) type may be used instead. In the case where the rotor of the IPM type is used, it is preferable that the rotor holder 32 should be defined by laminated magnetic steel sheets.

The rotor magnet 33 preferably is cylindrical or substantially cylindrical in shape, and is fixed to an outer circumferential surface of the rotor holder 32. A radially outer surface of the rotor magnet 33 defines a pole surface arranged radially opposite the stator core 23 and the coils 24. The rotor magnet 33 is polarized such that north pole surfaces and south pole surfaces are arranged alternately in the circumferential direction. Note that, in place of the cylindrical rotor magnet 33, a plurality of magnets may alternatively be arranged such that north poles and south poles alternate with each other in the circumferential direction. Also note that the rotor magnet 33 may be embedded in the rotor holder 32 while the rotor of the IPM type is used as mentioned above.

Figure 5:
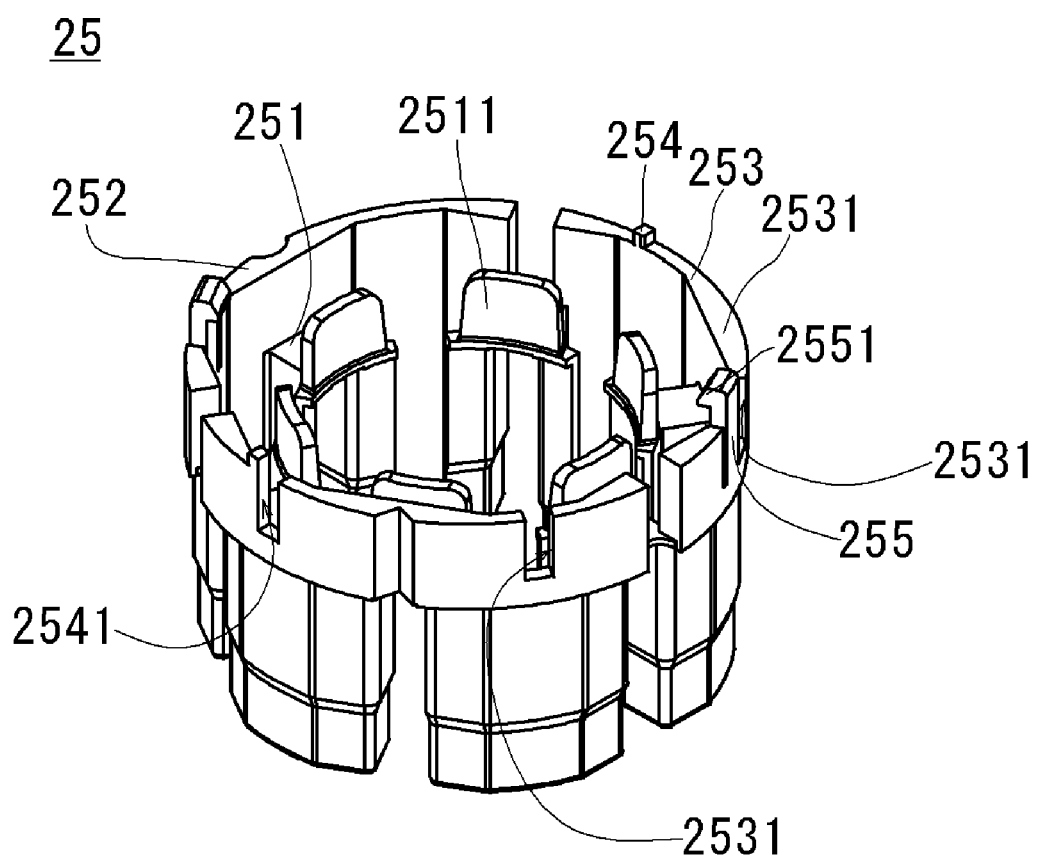
FIG. 5 is a perspective view of an upper insulator according to a preferred embodiment of the present invention.

FIG. 5 is a perspective view of an external appearance of the upper insulator 25 according to the present preferred embodiment. Referring to FIGS. 4 and 5, the circuit board 27 is preferably in or substantially in the shape of a disk in the plan view. An outer circumferential surface of the circuit board 27 includes cuts each of which is recessed radially inward from an outer circumference thereof. Each of these cuts is a positioning portion 272. A protruding positioning portion 254 of the upper insulator 25, which will be described below, is inserted into each of the positioning portions 272. Thus, when the circuit board 27 is about to move relative to the upper insulator 25, the protruding positioning portion 254 makes contact with a corresponding one of the positioning portions 272 to restrain the circuit board 27 from moving. As a result, circumferential and radial positioning of the circuit board 27 with respect to the upper insulator 25 is accomplished with high precision.

In addition, a connector 273 is preferably mounted on an upper surface of the circuit board 27. The motor 1 receives the drive currents through the connector 273.

Moreover, the outer circumferential surface of the circuit board 27 further includes cuts each of which is recessed radially inward from the outer circumference thereof. Each of these cuts is a hook insertion portion 274. Each hook insertion portion 274 is a penetration portion. In the present preferred embodiment, a land is arranged in a region adjacent to each hook insertion portion 274 on the upper surface of the circuit board 27. Hook portions 255 of the upper insulator 25, which will be described below, are inserted through the hook insertion portions 274. Each hook insertion portion 274 preferably includes a "decreased width hook insertion portion" 2741 where the cut has a decreased radial width, and an "increased width hook insertion portion" 2742 arranged adjacent to the decreased width hook insertion portion 2741 and having a greater radial width than that of the decreased width hook insertion portion 2741. In more detail, each hook portion 255 is inserted through the decreased width hook insertion portion 2741.

In the present preferred embodiment, the outer circumferential surface of the circuit board 27 further includes cuts, each of which is recessed radially inward from the outer circumference thereof. Each of these cuts is preferably a wire draw-out portion 277. In the present preferred embodiment, each wire draw-out portion 277 is a penetration portion. A land is arranged in a region adjacent to each wire draw-out portion 277 on the upper surface of the circuit board 27.

A central opening portion 276 passing through the circuit board 27 in the axial direction is defined in a center of the circuit board 27. The shaft 31 is positioned in the central opening portion 276.

Note that a wiring pattern needs to be arranged so as to be spaced from an edge of the circuit board 27 by a certain distance. It is therefore desirable that the number of holes and cuts defined in the circuit board 27 should be reduced to increase a wiring area on the circuit board 27. In the present preferred embodiment, each of the portions (i.e., the penetration portions), such as the hook insertion portions 274, in which protruding portions are inserted is increased in width so that the portion is configured to be used as a cut for the conducting wire drawn out. An increase in the wiring area on the circuit board 27 is thus achieved.

The above technique is particularly useful when a large electronic component, such as a control IC, an AC-DC converter, an encoder, or a connector, is mounted on the circuit board, when the width of each wire in the wiring pattern is increased to allow a large amount of current to pass on the circuit board, and when there is a need to decrease the area of the circuit board itself.

First, the upper bracket 21 will be described in detail below. The upper bracket 21 preferably includes a cover portion 211, the holding portion 212, an upper projecting portion 213, a plurality of through holes 214, and an opening 215. The cover portion 211 is preferably in or substantially in the shape of a flat plate, and is arranged axially above the circuit board 27. The holding portion 212 is arranged radially inside the cover portion 211, and is arranged to project axially upward. The holding portion 212 preferably includes the inner circumferential surface 2121, which is cylindrical, and an annular top surface 2122. The inner circumferential surface 2121 is arranged to be in contact with an outer circumferential surface of the outer race of the upper bearing 281. The top surface 2122 is arranged to be in indirect contact with an upper end surface of the outer race of the upper bearing 281 with a spring intervening therebetween. The holding portion 212 is thus configured to hold the upper bearing 281. An outer circumferential surface of the upper bearing 281 is configured to have a diameter smaller than that of the central opening portion 276 of the circuit board 27. This contributes to preventing the upper bearing 281 from interfering with the circuit board 27, and reducing the thickness of the motor 1.

The upper projecting portion 213 is configured to project axially downward from a radially outer end of the cover portion 211. The upper projecting portion 213 is preferably annular or substantially annular. In addition, the upper projecting portion 213 is preferably cylindrical or substantially cylindrical. An inner circumferential surface of the upper projecting portion 213 is configured to be in contact with an upper portion of the outer circumferential surface of the stator core 23. This contributes to improving precision with which the upper bearing 281 is coaxial with the central axis J1, and also contributes to improving strength of the upper bracket 21. In the present preferred embodiment, the stator core 23 is preferably press fitted into the upper projecting portion 213, and is thus fixed to the upper bracket 21. Note, however, that the stator core 23 may be alternatively fixed to the upper bracket 21 through insertion and adhesion instead of through press fit, if so desired. In the case where the stator core 23 is fixed to the upper bracket 21 through the insertion and adhesion, the inner circumferential surface of the upper projecting portion 213 may be configured to make contact with an outer circumfertental surface of the circuit board 27 or an outer circumferential surface of the upper insulator 25. An improvement in the strength of the upper bracket 21 is preferably achieved by arranging the inner circumferential surface of the upper projecting portion 213 to make contact with the circuit board 27 or the upper insulator 25.

The plurality of through holes 214 are arranged in the circumferential direction in a radially outer portion of the cover portion 211. The number of through holes 214 is preferably six in the present preferred embodiment, for example.

In the case where an electronic component which generates a large amount of heat is mounted on the circuit board 27, the cover portion 211 is preferably arranged opposite to this electronic component. This makes it possible to arrange the electronic component closer to the upper bracket 21. The heat generated by the electronic component is thus dissipated through the upper bracket 21. Note that a heat conducting material, such as, for example, a silicone, may be arranged to intervene between the electronic component and the cover portion 211. This promotes dissipation of the heat from the electronic component. Examples of electronic components which generate a large amount of heat include a field-effect transistor (FET).

The opening 215 is preferably a through hole defined in the cover portion 211. The connector 273 mounted on the circuit board 27 is exposed through the opening 215. The external power supply is preferably connected to the connector 273 through the opening 215 to supply power to the motor 1.

Referring to FIG. 5, the shape of the upper insulator 25 will now be described in detail below. The upper insulator 25 includes magnetic pole tooth insulating portions 251 and the core back insulating portion 252. Each magnetic pole tooth insulating portion 251 is arranged to cover the upper surface and the side surfaces of a separate one of the magnetic pole teeth 232. The core back insulating portion 252 is annular, and is configured to join the magnetic pole tooth insulating portions 251 to one another. A plate portion 2511 configured to project axially upward is arranged at a radially inner end of each magnetic pole tooth insulating portion 251. The core back insulating portion 252 is configured to extend axially upward radially outside the coils 24. An upper end surface of the core back insulating portion 252 is arranged at an axial level higher than an axial level of an upper end of each coil 24. Each coil 24 is thus prevented from interfering with another member, such as the circuit board 27, the upper bracket 21, or the like.

The core back insulating portion 252 preferably includes an annular wall portion 253, the protruding positioning portions 254, and the hook portions 255. The annular wall portion 253 is preferably an annular or a substantially annular wall arranged to project in the axial direction from a radially outer end of the core back insulating portion 252. An upper surface of the annular wall portion 253 defines a seating surface 2531, and is a flat surface perpendicular or substantially perpendicular to the central axis J1. The seating surface 2531 is arranged to make contact with the lower surface of the circuit board 27. More specifically, the seating surface 2531 is arranged to make contact with a lower surface of an outer edge portion of the circuit board 27. An outer end of the annular wall portion 253 is arranged radially inward of an outer end of the stator core 23. Accordingly, a portion of the stator core 23 which is radially outward of the annular wall portion 253 defines an upper core back exposed portion 41 arranged to be exposed axially upwardly.

Each protruding positioning portion 254 is preferably arranged at or substantially at the same radial position as that of the annular wall portion 253, and is arranged to project axially upward above the seating surface 2531. In addition, each protruding positioning portion 254 is preferably arranged axially below the upper surface of the circuit board 27. Therefore, each protruding positioning portion 254 is accommodated in a corresponding one of the positioning portions 272 of the circuit board 27. This contributes to preventing each protruding positioning portion 254 from making contact with the upper bracket 21 even when a lower surface of the cover portion 211 of the upper bracket 21 is brought into contact with the upper surface of the circuit board 27 as described below. This in turn contributes to securely fixing the circuit board 27.

In the present preferred embodiment, the protruding positioning portions 254 are arranged at two different circumferential positions spaced from each other. Note that, although it is assumed in the present preferred embodiment that the number of protruding positioning portions 254 preferably is two, for example, this is not essential to the present invention. The number of protruding positioning portions 254 may alternatively be one or more than two.

The shape of each protruding positioning portion 254 is preferably identical or substantially identical to the shape of each positioning portion 272 in a plan view. That is, each protruding positioning portion 254 is shaped to have a contour extending along a contour of a corresponding one of the positioning portions 272. This enables the circuit board 27 to be positioned with high precision with respect to the upper insulator 25.

More preferably, both circumferential end surfaces of the protruding positioning portion 254 are arranged to be in contact with circumferential end surfaces of the positioning portion 272. In addition, a radial end surface of the protruding positioning portion 254 is preferably configured to be in contact with a radial end surface of the positioning portion 272. This enables the circuit board 27 to be positioned with high precision with respect to the upper insulator 25. Note that the positioning of the circuit board 27 with respect to the upper insulator 25 is accomplished with high precision even when only one end surface of the protruding positioning portion 254 is arranged to be in contact with an opposed end surface of the positioning portion 272. Precise positioning of the circuit board 27 with respect to the upper insulator 25 makes it possible to solder the conducting wires to the circuit board 27 in a soldering process described below while preventing each conducting wire from being held between the upper insulator 25 and the circuit board 27.

A first window portion 2541 defined by an axially downward cut is preferably arranged circumferentially adjacent to one of the protruding positioning portions 254. A lower end of the first window portion 2541 is arranged at an axial level lower than an axial level of an upper end of the plate portion 2511 of each magnetic pole tooth insulating portion 251.

Each hook portion 255 is a portion arranged to project in the axial direction from the core back insulating portion 252, and arranged to overlap with the annular wall portion 253 with respect to a radial direction. The hook portion 255 is arranged at a different circumferential position from that of each magnetic pole tooth insulating portion 251. An axially upper end of the hook portion 255 is arranged at an axial level higher than an axial level of the upper surface of the circuit board 27, and the hook portion 255 is arranged to project axially upward above the seating surface 2531 and to a greater extent than each protruding positioning portion 254. The hook portion 255 includes a hook-shaped portion 2551 at a top thereof. The hook-shaped portion 2551 is arranged to project radially inward. A lower surface of the hook-shaped portion 2551 is arranged to be in contact with the upper surface of the circuit board 27, or is arranged opposite to the upper surface of the circuit board 27 with a gap intervening therebetween.

A second window portion 2552 is preferably arranged circumferentially adjacent to each hook portion 255. Each second window portion 2552 is defined by an axially downward cut defined in the annular wall portion 253. A lower end of the second window portion 2552 is arranged at an axial level lower than an axial level of the upper end of the plate portion 2511 of each magnetic pole tooth insulating portion 251.

Note that each of the protruding positioning portions 254 and the hook portions 255 is a protruding portion.

In addition, third window portions 2532, each of which is defined by an axially downward cut, are preferably defined in the annular wall portion 253 of the upper insulator 25. A lower end of each third window portion 2532 is arranged at a level lower than that of the upper end of the plate portion 2511 of each magnetic pole tooth insulating portion 251.

Note that, in the present preferred embodiment, four of the window portions 2532, 2541, and 2552 are preferably arranged at intervals of 60 degrees, and three of the window portions 2532, 2541, and 2552 are preferably arranged at intervals of 120 degrees (the latter three include two of the four window portions 2532, 2541, and 2552 arranged at intervals of 60 degrees), for example. That is, the total number of window portions 2532, 2541, and 2552 is preferably five, for example. This allows the conducting wires to be drawn out in both cases where the conducting wires are connected in the star configuration and where the conducting wires are connected in a delta configuration. Accordingly, the same upper insulator 25 can be used in common even when a method of connecting the conducting wires is changed. Note that a required number of window portions 2532, 2541, and 2552 arranged at different circumferential positions is four when only the star configuration is adopted to connect the conducting wires.

First, the lower bracket 22 will now be described in detail below. The lower bracket 22 preferably includes a lower cover portion 221, a lower holding portion 222, and a lower projecting portion 223. The lower bracket 22 is preferably in or substantially in the shape of a covered cylinder. The lower cover portion 221 is preferably in or substantially in the shape of an annular plate. The lower holding portion 222 is arranged radially inside the lower cover portion 221, and is arranged to project axially downward. The lower holding portion 222 preferably includes a cylindrical inner circumferential surface 2221 and an annular top surface 2222. The inner circumferential surface 2221 is configured to be in contact with an outer circumferential surface of the outer race of the lower bearing 282. The top surface 2222 is configured to be in contact with a lower end surface of the outer race of the lower bearing 281. The lower holding portion 222 is thus configured to hold the lower bearing 282.

The lower projecting portion 223 is configured to project axially upward from a radially outer end of the lower cover portion 221. The lower projecting portion 223 is preferably annular or substantially annular. In addition, the lower projecting portion 223 is cylindrical or substantially cylindrical. An upper portion of the lower projecting portion 223 is configured to be in contact with the outer circumferential surface of the stator core 23. This contributes to improving precision with which the lower bearing 282 is coaxial with the central axis J1, and also contributes to securely fixing the lower bracket 22 and the stator core 23 to each other. In the present preferred embodiment, the stator core 23 is preferably press fitted into the lower projecting portion 223, and is thus fixed to the lower bracket 22. Note, however, that the stator core 23 may alternatively be fixed to the lower bracket 22 through insertion and adhesion instead of through press fit. In addition, the lower projecting portion 223 preferably includes a positioning shoulder portion 2231 configured to decrease in inside diameter. An upper surface of the positioning shoulder portion 2231 is arranged to be in direct contact with the core back 231 of the stator core 23. This contributes to reducing a decrease in precision in axial positioning of the lower bracket 22 with respect to the stator core 23.

The lower cover portion 221 preferably includes a plurality of opening portions 228. Each opening portion 228 is a hole passing through the lower cover portion 221 in the axial direction. An inner circumferential surface of the opening portion 228 includes a screw groove defined therein. A screw is screwed into each opening portion 228 to fix the motor 1 to the drive apparatus.

Here, an annular cover member 71 is arranged between the opening portions 228 and the armature 29. In the present preferred embodiment, the cover member 71 is made of an elastic material, such as, for example, rubber, and an outer circumferential surface thereof is press fitted and fixed to an inner circumferential surface of the lower projecting portion 223. Note that it may be sufficient if the cover member 71 is arranged at least opposite to each opening portion 228. When the cover member 71 is arranged to intervene between the lower cover portion 221 and the armature 29, any extraneous material is prevented from intruding into an interior of the motor 1. In particular, when the motor 1 is attached to the drive apparatus, any metal particles, which may be generated as a result of any screw being rubbed against a corresponding one of the opening portions 228, are preferably prevented from entering into the interior of the motor 1. This leads to an improvement in reliability of the motor 1. In addition, in the present preferred embodiment, an upper surface of the cover member 71 is arranged to be in contact with the lower insulator 26 of the armature 29. The cover member 71 has elasticity. Therefore, the contact of the cover member 71 with the lower insulator 26 contributes to reducing vibrations and noise which are generated by the armature 29.

Moreover, in the present preferred embodiment, the cover member 71 preferably includes a collar portion 711 configured to extend axially downward radially inside the opening portions 228, an increased thickness portion 712 having an increased axial thickness and arranged radially outside the opening portions 228, and a hem portion 713 having a smaller axial thickness than that of the increased thickness portion 712, and arranged radially outward of the increased thickness portion 712. The collar portion 711 is arranged to be in contact with the lower cover portion 221 of the lower bracket 22. This contributes to preventing dust from intruding toward the lower bearing 281 and the rotor holder 32. A portion of an inner circumferential surface of the collar portion 711 includes an inclined portion extending radially inward with decreasing height. This prevents the cover member 71 from making contact with the rotating portion 3. Moreover, the cover member 71 is inserted inside the inner circumferential surface of the lower projecting portion 223 with the hem portion 713 adjacent to the inner circumferential surface of the lower projecting portion 223. That is, the cover member 71 is inserted inside the inner circumferential surface of the lower projecting portion 223 not with the increased thickness portion 712 having a larger thickness adjacent thereto but with the hem portion 713 having a smaller thickness adjacent thereto. This facilitates smooth insertion of the cover member 71. Moreover, the increased thickness portion 712 is arranged inside the hem portion 713 to prevent deformation of the entire cover member 71. This in turn contributes to effectively preventing dust from entering into the interior of the motor 1. Note that the cover member 71 may not necessarily be made of rubber, but may alternatively be made of another material, such as, for example, plastic. Also note that the cover member 71 may be press fitted in the lower projecting portion 223 instead of being inserted in the lower projecting portion 223. Also note that the cover member 71 may be arranged not near the lower bracket 22 but near the upper bracket 21, and that the cover member 71 may be arranged near each of the upper and lower brackets 21 and 22.

In the case where, regarding a known inner-rotor motor, each of the upper and lower brackets 21 and 22 is produced by the press working, each opening portion 228 needs to be a through hole as described above. When each opening portion 228 is a through hole, there is a probability that dust will enter into the interior of the motor. However, use of the cover member 71 described above preferably prevents any extraneous material, such as, for example, metal particles or dust, from entering into the interior of the motor.

Figure 6:
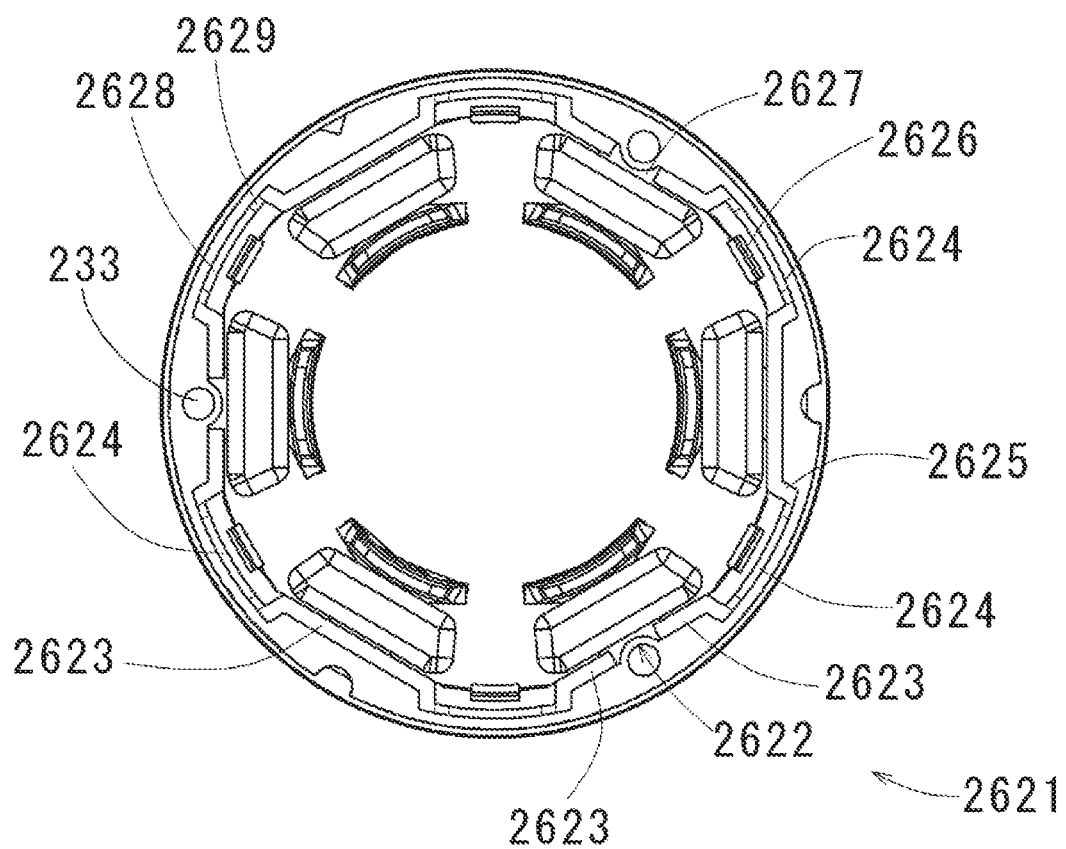
FIG. 6 is a plan view of a lower insulator according to a preferred embodiment of the present invention.
Figure 7:
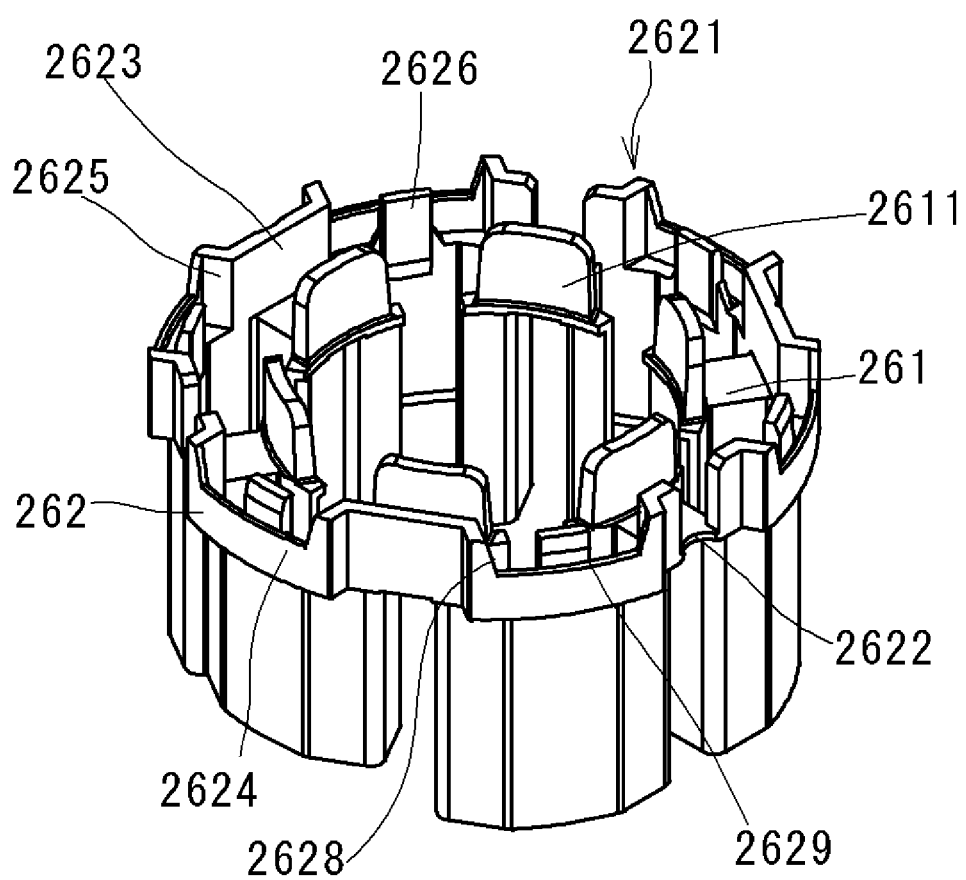
FIG. 7 is a perspective view of the lower insulator.

FIG. 6 is a plan view of the lower insulator 26. FIG. 7 is a perspective view of the lower insulator 26. Referring to FIGS. 6 and 7, the shape of the lower insulator 26 will be described in detail below. The lower insulator 26 preferably includes lower magnetic pole tooth insulating portions 261 and a lower core back insulating portion 262. Each lower magnetic pole tooth insulating portion 261 is arranged to cover the lower surface and the side surfaces of a separate one of the magnetic pole teeth 232. The lower core back insulating portion 262 is annular, and is configured to join the lower magnetic pole tooth insulating portions 261 to one another. A plate portion 2611 arranged to project in the axial direction is preferably arranged at a radially inner end of each lower magnetic pole tooth insulating portion 261. The plate portion 2611 is a plate-shaped wall extending in the circumferential direction. The plate portion 2611 is arranged radially opposite an inner end of a corresponding one of the coils 24. The lower core back insulating portion 262 preferably includes a lower core back insulating projecting portion 2621 projecting in the axial direction away from a surface covering the core back 231. The lower core back insulating projecting portion 2621 is configured to serve as a wall extending in the circumferential direction.

The lower core back insulating projecting portion 2621 preferably includes cut portions 2622, coil guide walls 2623, passage line guide walls 2624, joining walls 2625, and passage line holding portions 2626. Each cut portion 2622 refers to a cut defined in the wall of the lower core back insulating projecting portion 2621 extending continuously in the circumferential direction. In the present preferred embodiment, the coil guide walls 2623, the passage line guide walls 2624, and the joining walls 2625 together define the circumferentially continuous wall of the lower core back insulating projecting portion 2621 together with the cut portions 2622. Each cut portion 2622 is defined in the lower core back insulating projecting portion 2621 at a position radially opposed to one of the lower magnetic pole tooth insulating portions 261. Two of the coil guide walls 2623 are arranged on both circumferential sides of each cut portion 2622. The cut portion 2622 is preferably configured to have a circumferential width smaller than the circumferential width of each magnetic pole tooth 232 around which the conducting wire is wound. In other words, the lower core back insulating projecting portion 2621 is configured to be continuous except at the cut portions 2622. An improvement in rigidity of the lower insulator 26 is thus achieved.

The coil guide walls 2623 are arranged radially outside the magnetic pole tooth insulating portions 261. Each coil guide wall 2623 is arranged radially inward of each passage line guide wall 2624 described below. A radially inner surface of each coil guide wall 2623 is arranged opposite to a radially outer side of a corresponding one of the coils 24 each of which is defined by the conducting wire wound around a separate one of the magnetic pole teeth 232. Preferably, the radially inner surface of each coil guide wall 2623 is arranged to be in contact with the radially outer side of the corresponding coil 24. Multiple turns of the conducting wire are wound around each of the magnetic pole teeth 232 to define the coils 24. That is, a collapse of each coil 24 is preferably prevented by using the insulator or another member to prevent the multiple turns of the conducting wire from becoming loose. Provision of the coil guide walls 2623 prevents a radially outward collapse of each coil 24.

Each passage line guide wall 2624 preferably is integrally joined to adjacent ones of the coil guide walls 2623. That is, each passage line guide wall 2624 and each adjacent coil guide wall 2623 are joined to each other through one of the joining walls 2625. An improvement in rigidity of the coil guide wall 2623 is achieved by joining the coil guide wall 2623 and the passage line guide wall 2624 to each other through the joining wall 2625. As a result, a fall of the lower core back insulating projecting portion 2621 is prevented even if winding of the conducting wire causes tension to the lower core back insulating projecting portion 2621. Each coil guide wall 2623 is arranged radially inward of each passage line guide wall 2624. Each passage line guide wall 2624 is configured to have a radial thickness smaller than that of each coil guide wall 2623.

Each passage line guide wall 2624 is preferably a wall-shaped portion configured to guide a passage line(s) led from the coil(s) 24. The passage line guide wall 2624 is configured to project in the axial direction away from the surface covering the core back 231. Each of the passage line holding portions 2626 is arranged radially inside a separate one of the passage line guide walls 2624. Each passage line holding portion 2626 is configured to support the corresponding passage line(s) with a radially outer surface thereof. An inner surface of each passage line guide wall 2624 and a corresponding one of the passage line holding portions 2626 are arranged radially opposite each other. The passage line(s), each of which is a portion of the conducting wire, are arranged between the passage line guide wall 2624 and the corresponding passage line holding portion 2626 and are thus guided. Each passage line holding portion 2626 includes a slanting surface at a top of the outer surface thereof. When the passage line(s), each of which is a portion of the conducting wire, are inserted between the passage line holding portion 2626 and the corresponding passage line guide wall 2624, the passage line(s) are guided by this slanting surface, and workability is improved. Moreover, each of both circumferential ends of each passage line holding portion 2626 preferably includes a slanting surface configured to obliquely extend in the circumferential direction away from a middle of the passage line holding portion 2626. This contributes to increasing the strength of the passage line holding portion 2626, and, in turn, to preventing a fall of the passage line holding portion 2626 even if tension is caused to the passage line holding portion 2626. Moreover, in the present preferred embodiment, all the passage lines are preferably arranged on a side of the armature 29 closer to the lower bracket 22. Therefore, no passage lines are arranged on a side of the armature 29 closer to the upper bracket 21, where the circuit board 27 is arranged. This eliminates a need to take the passage lines into consideration when arranging the wiring pattern on the circuit board 27, resulting in improved flexibility in circuit design.

Each passage line guide wall 2624 preferably includes inclined portions 2629 each of which extends from a separate circumferential end of the passage line guide wall 2624 toward a circumferential middle thereof while gradually decreasing in axial height. The passage line guide wall 2624 preferably further includes a middle portion 2628 arranged in the circumferential middle thereof, and configured to have a smaller axial height than that of each inclined portion 2629. That is, an upper end of a portion (i.e., the middle portion 2628) of the passage line guide wall 2624 which is radially opposed to the corresponding passage line holding portion 2626 is arranged at a level lower than that of an upper end of the passage line holding portion 2626. This arrangement enables a nozzle of a winding machine to be inserted deeper when winding the conducting wire. This makes it possible to securely hold the passage line(s) on each passage line holding portion 2626. Moreover, since the middle portion 2628 of the passage line guide wall 2624 is reduced in axial height, it is possible to make the axial height of the passage line holding portion 2626 relatively small. This leads to a reduction in a moment load applied when the passage line(s) are held on the passage line holding portion 2626. This in turn contributes to preventing a fall of the passage line holding portion 2626 in the radial direction.

Note that the ratio of the width of a radial gap between each passage line guide wall 2624 and the corresponding passage line holding portion 2626 to the height of the passage line holding portion 2626 is preferably configured to be equal to or less than 1 to 3, for example. This is because the motor 1 according to the present preferred embodiment preferably is a three-phase motor, and three passage lines may be placed one upon another. More preferably, the ratio of the width of the radial gap between each passage line guide wall 2624 and the corresponding passage line holding portion 2626 to the height of the passage line holding portion 2626 is configured to be equal to or less than 1 to 4, for example. This is because an additional passage line may be provided for adjustment of inductance, adjustment of positions from which the conducting wires are drawn out, or the like. The above setting of the ratio contributes to ensuring secure holding of the passage lines.

Moreover, the axial height of the middle portion 2628 of each passage line guide wall 2624 is preferably configured to be smaller than that of each of the coil guide walls 2623, the joining walls 2625, and the passage line holding portions 2626. This arrangement contributes to reducing the axial dimension of the passage line guide wall 2624. This in turn contributes to reducing the axial dimension of the lower insulator 26, and in turn to reducing the thickness of the motor 1.

Furthermore, the axial height of each passage line holding portion 2626 is configured to be smaller than that of each of the coil guide walls 2623 and the joining walls 2625. Furthermore, the axial height of the passage line holding portion 2626 is configured to be smaller than that of each plate portion 2611 of the lower insulator 26.

Next, a process of fitting the armature 29 and the circuit board 27 to each other will now be described below. Note that the assembly including the stator core 23, the coils 24, the upper insulator 25, and the lower insulator 26 is defined as the armature 29.

First, the end portions of the conducting wires extending from the coils 24 and used for the U phase, the V phase, the W phase, and the common, respectively, are drawn out radially outward through the window portions 2541 and 2552 of the upper insulator 25. This prevents each conducting wire from being held between the upper insulator 25 and the circuit board 27 if the circuit board 27 is placed on the armature 29.

Next, the circuit board 27 is placed on the seating surface 2531 of the upper insulator 25 of the armature 29. At this time, each protruding positioning portion 254 is inserted into a corresponding one of the positioning portions 272 of the circuit board 27. This improves precision with which the circuit board 27 is positioned with respect to the armature 29. This in turn improves precision in positioning the magnetic sensor 271 mounted on the circuit board 27. In addition, each hook portion 255 is inserted through a corresponding one of the hook insertion portions 274 of the circuit board 27. The hook portion 255 undergoes elastic deformation, so that the hook-shaped portion 2551 of the hook portion 255 is in contact with the upper surface of the circuit board 27 or is arranged axially opposite the upper surface of the circuit board 27 with a gap intervening therebetween. This prevents the circuit board 27 from moving in the axial direction relative to the armature 29, accomplishing temporary fixing of the circuit board 27.

At this time, the circumferential positions of the window portions 2552 and those of the hook insertion portions 274 coincide with each other. Preferably, the circumferential positions of the window portions 2552 and those of the increased width hook insertion portions 2742 coincide with each other. This improves workability in the soldering process described below.

Next, each of the drawn-out end portions of the conducting wires is soldered to a corresponding one of the lands on the upper surface of the circuit board 27. Some of the lands are arranged adjacent to the hook insertion portions 274 to facilitate the soldering process.

While preferred embodiments of the present invention have been described above, it will be understood that the present invention is not limited to the above-described preferred embodiments.

Figure 8:
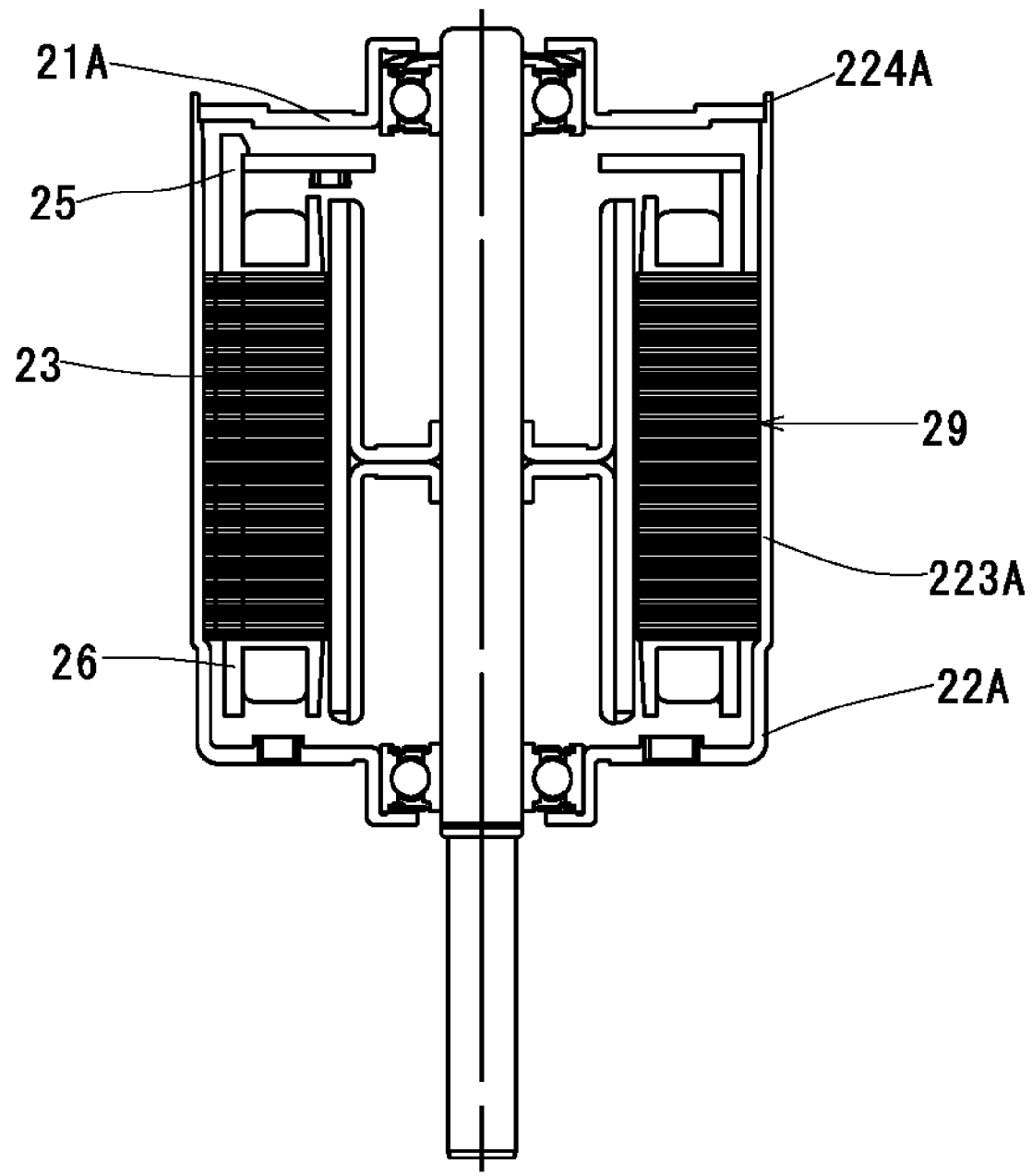
FIG. 8 is a cross-sectional view of a motor according to a preferred embodiment of the present invention.

FIG. 8 is a diagram illustrating another preferred embodiment of the present invention. Descriptions below center on differences from the above-described preferred embodiment. Referring to FIG. 8, a lower bracket 22A is arranged to cover an outer circumferential surface of an armature 29. More specifically, the lower bracket 22A according to the present preferred embodiment is configured to have an axial dimension greater than that of a stator core 23. Further, the axial dimension of the lower bracket 22A is configured to be greater than the combined axial dimension of an upper insulator 25 and a lower insulator 26. More specifically, the axial dimension of a lower projecting portion 223A of the lower bracket 22A is preferably configured to be greater than the combined axial dimension of the upper insulator 25 and the lower insulator 26. A crimping portion 224A to which an upper bracket 21A described below is fixed is preferably arranged at a top of the lower projecting portion 223A of the lower bracket 22A. The upper bracket 21A is in or substantially in the shape of a disk, and includes no upper projecting portion 213A. The upper bracket 21A is fixed to the lower bracket 22A as a result of plastic deformation of the crimping portion 224A. A casing may be defined in the above-described manner.

The casing arranged to cover an entire outer side of the armature 29 as described above contributes to reducing vibrations and noise which are generated in the motor, and also to preventing dust from intruding into an interior of the motor.

Figure 9:
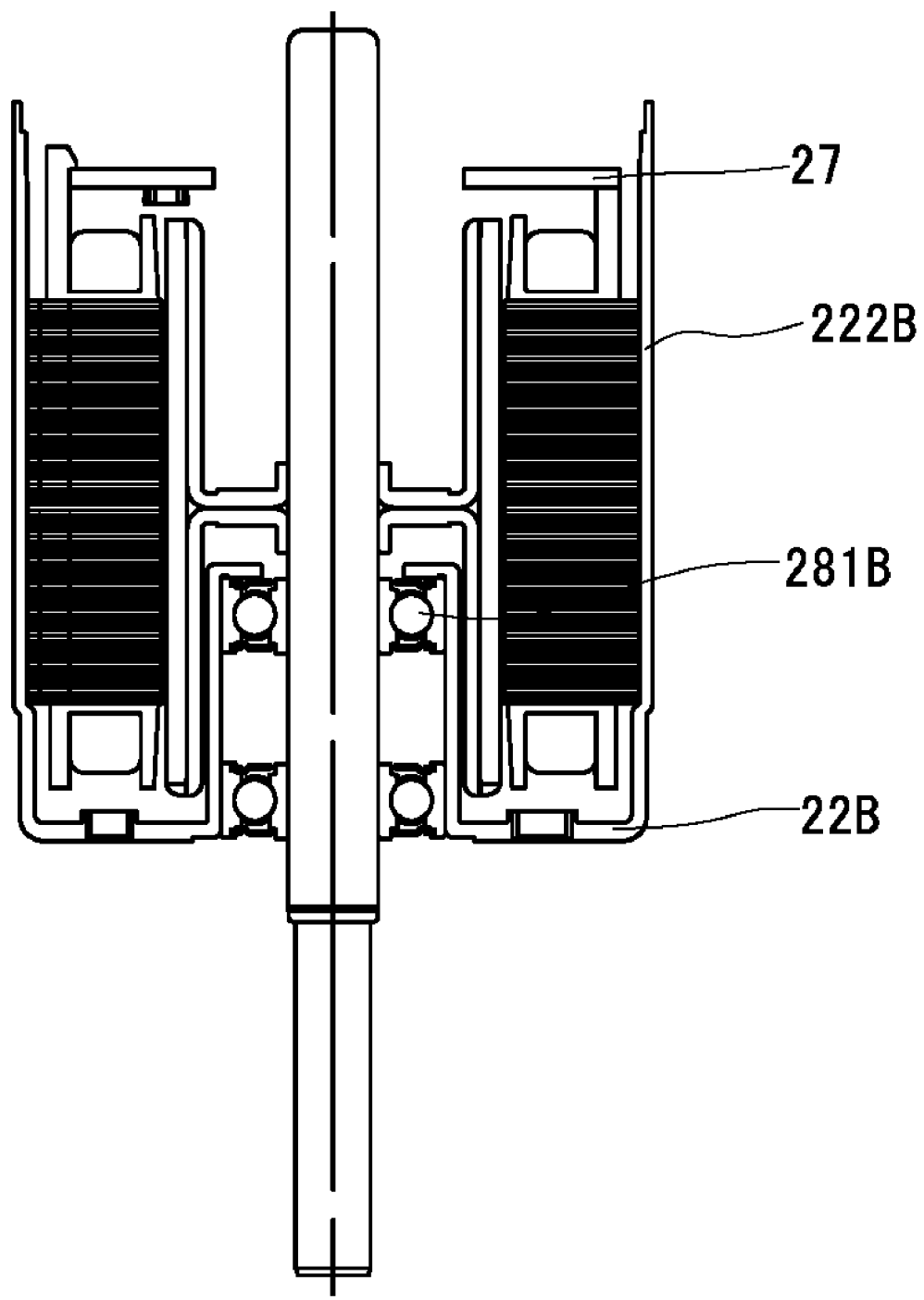
FIG. 9 is a cross-sectional view of a motor according to a preferred embodiment of the present invention.

FIG. 9 is a diagram illustrating yet another preferred embodiment of the present invention. Referring to FIG. 9, a lower holding portion 222B of a lower bracket 22B extends axially upward to a great extent. Moreover, the lower holding portion 222B is configured to hold not only a lower bearing 282B but also an upper bearing 281B. Furthermore, in the present preferred embodiment, no upper bracket is provided, so that a circuit board 27 is exposed. Note that a member arranged to cover the circuit board 27 may be provided in place of the upper bracket.

Figure 10:
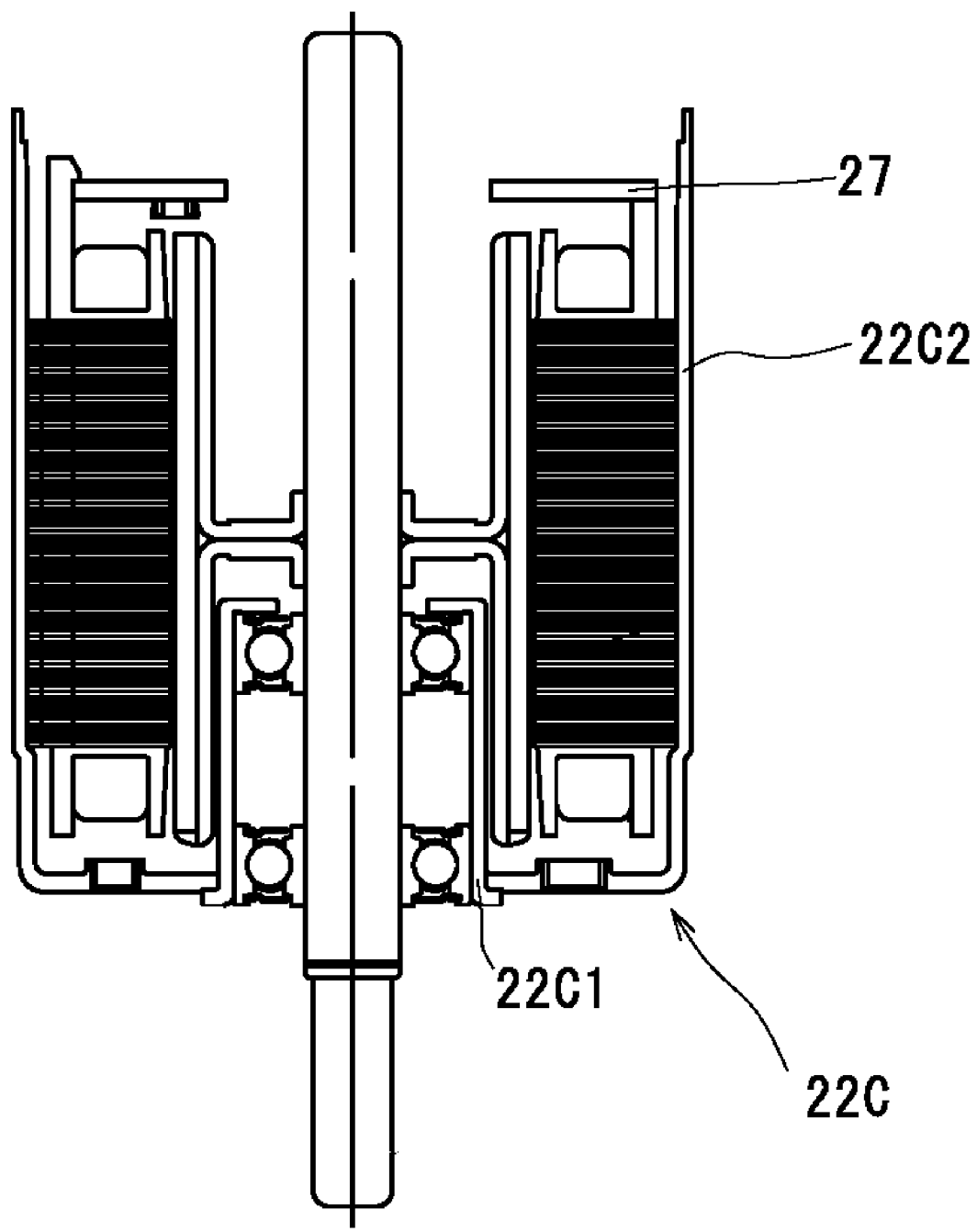
FIG. 10 is a cross-sectional view of a motor according to a preferred embodiment of the present invention.

FIG. 10 is a diagram illustrating yet another preferred embodiment of the present invention. Referring to FIG. 10, a lower bracket 22C according to this preferred embodiment preferably includes two members: an inner lower bracket 22C1 and an outer lower bracket 22C2.

Figure 11:
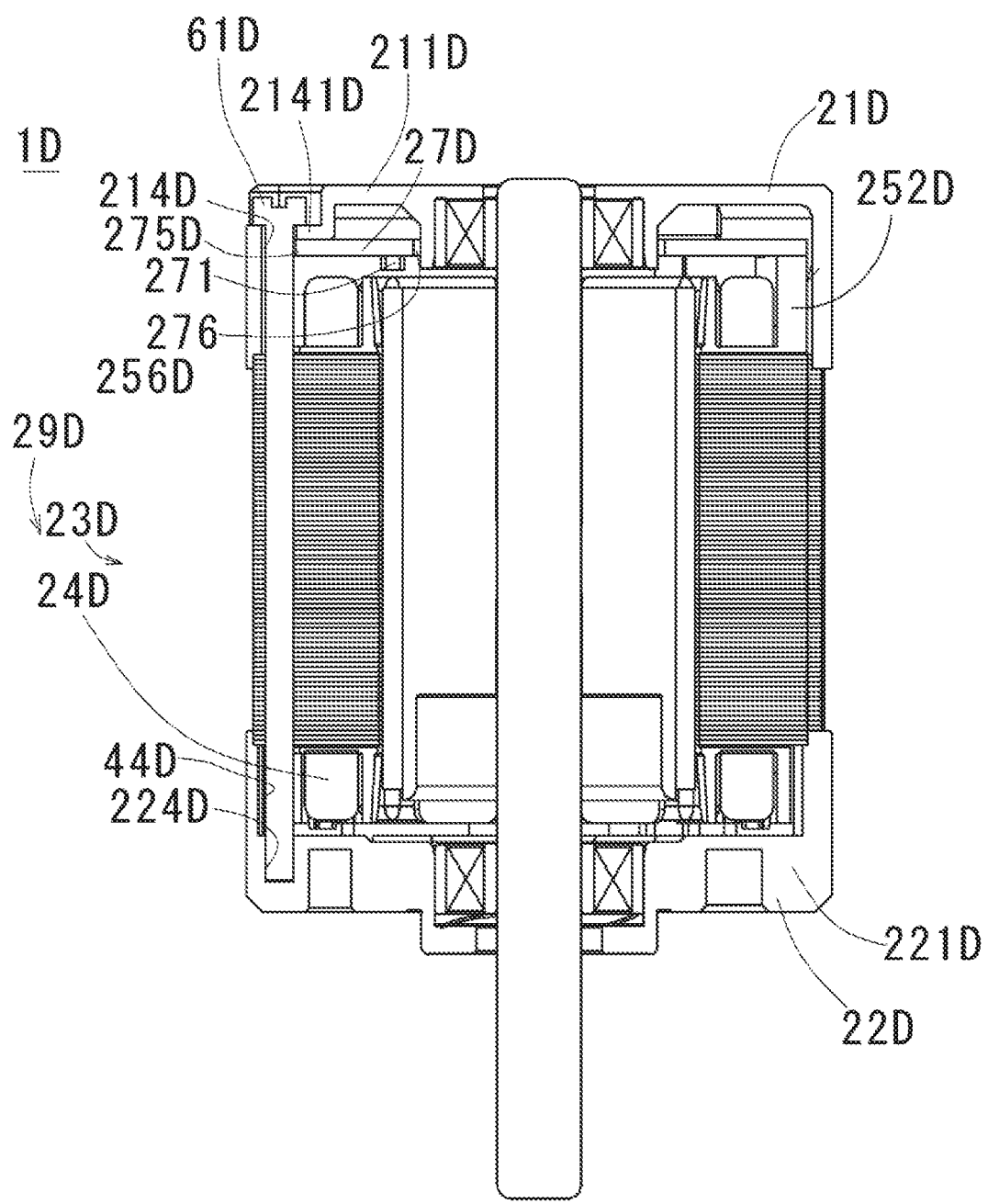
FIG. 11 is a cross-sectional view of a motor according to a preferred embodiment of the present invention.

FIG. 11 is a diagram illustrating yet another preferred embodiment of the present invention. Referring to FIG. 11, in the present preferred embodiment, an upper bracket 21D and a lower bracket 22D are preferably fixed to an armature 29D through fixing members 61D. First, an outer circumferential surface of a circuit board 27D includes cuts each of which is recessed radially inward from an outer circumference thereof. Each of these cuts is referred to as a fixing member insertion portion 275D. Each fixing member insertion portion 275D preferably includes a surface matching the shape of a screw portion of the fixing member (i.e., a screw) 61D in a plan view. Note that, in the present preferred embodiment, each of the upper and lower brackets 21D and 22D is molded by a die-casting process, for example. Therefore, in the present preferred embodiment, each opening portion 228 does not need to be a through hole. Therefore, there is only a small probability that dust will intrude into an interior of the motor even if the cover member 71 is omitted.

The upper bracket 21D preferably includes a plurality of through holes 214D. The through holes 214D are preferably arranged in the circumferential direction in a radially outer portion of a cover portion 211D. In the present preferred embodiment, the number of through holes 214D is three, for example. The screw 61D is inserted through each through hole 214D. A seating surface 2141D is arranged around each through hole 214D. The seating surface 2141D is arranged at an axial level lower than an axial level of an upper surface of the cover portion 211D. A head portion of the screw 61D is arranged to be in contact with the seating surface 2141D. In other words, the screw 61D includes a lower surface arranged to be in contact with an upper surface of the upper bracket 21D. This prevents the inserted screw 61D from protruding above the cover portion 211D. This contributes to reducing the thickness of a motor 1D. In addition, the screw portion of the screw 61D is configured to have a diameter equal to or slightly smaller than that of the through hole 214D. This contributes to restraining the upper bracket 21D from moving in the circumferential direction relative to the armature 29D after insertion of the screws 61D. This leads to firm fixing of the upper bracket 21D and the armature 29D to each other. Note that each fixing member 61D may be a rivet, for example. A ground pattern may be arranged at an edge of any fixing member insertion portion 275D of the circuit board 27D. This enables a ground to be established between the ground pattern of the circuit board 27D and the upper bracket 21D through the screw 61D.

An upper insulator 25D includes "fixing member insertion recessed portions" 256D. Each fixing member insertion recessed portion 256D is a recessed portion which is recessed radially inward from an outer edge of a core back insulating portion 252D. The screw 61D is inserted through each fixing member insertion recessed portion 256D. Note that the fixing member insertion recessed portion 256D may not necessarily be the recessed portion which is recessed radially inward, but may be a through hole passing through the upper insulator 25D in the axial direction.

The lower bracket 22D includes a plurality of lower fixing member accommodating portions 224D. The lower fixing member accommodating portions 224D are arranged in the circumferential direction in a radially outer portion of a lower cover portion 221D. In the present preferred embodiment, the number of lower fixing member accommodating portions 224D is preferably three, for example. The circumferential positions of the lower fixing member accommodating portions 224D are arranged to coincide with those of the through holes 214D of the upper bracket 21D. The screw 61D is inserted into each lower fixing member accommodating portion 224D. Note that the lower fixing member accommodating portion 224D according to the present preferred embodiment preferably is a bag-shaped hole and not a through hole, but may be a through hole.

The shape of a lower insulator 26 according to the present preferred embodiment is similar to that of the lower insulator 26 as illustrated in FIGS. 6 and 7. Referring to FIGS. 6 and 7, cut portions 2622 of a lower core back insulating projecting portion 2621 according to the present preferred embodiment are defined in the lower core back insulating projecting portion 2621 at positions radially opposed to lower magnetic pole tooth insulating portions 261. A fixing member arranging portion 44D of a stator core 23D and the screw 61D are arranged radially outside each cut portion 2622. That is, each cut portion 2622 is arranged radially opposite a separate one of the screws 61D. In other words, the cut portions 2622 are defined in the lower core back insulating projecting portion 2621 at positions radially opposed to the screws 61D.

Coil guide walls 2623 are arranged radially outside the magnetic pole tooth insulating portions 261. A radially inner surface of each coil guide wall 2623 is arranged to be in contact with a radially outer side of a corresponding one of coils 24D each of which is defined by a conducting wire wound around a separate one of magnetic pole teeth 232D. Multiple turns of the conducting wire are wound around each of the magnetic pole teeth 232D to define the coils 24D. That is, a collapse of each coil 24D preferably is prevented by using an insulator or another member to prevent the multiple turns of the conducting wire from becoming loose. In particular, in the present preferred embodiment, the fixing member arranging portions 44D and the screws 61D are preferably arranged radially outside the coils 24D. If a collapse of any coil 24D should happen, the coil 24D and the adjacent fixing member arranging portion 44D may overlap with each other in a plan view when the motor is assembled. If this happens, it is impossible to insert the screw 61D into this fixing member arranging portion 44D. Also, a collapse of any coil 24D may happen after each screw 61D is inserted into the corresponding fixing member arranging portion 44D, and the conducting wire of the collapsed coil 24D may be brought into contact with the adjacent screw 61D. In the case where the screw 61D is made of a conductive material, the contact of the conducting wire of the collapsed coil 24D with the screw 61D may cause an applied electric field to exceed the dielectric strength of a coating of the conducting wire of the coil 24D. Accordingly, the coil guide walls 2623A are preferably provided to prevent a radially outward collapse of each coil 24D.

Each screw 61D is inserted into the corresponding fixing member arranging portion 44D to fix the upper bracket 21D and the armature 29D to the lower bracket 22D. A radially inner end of each fixing member arranging portion 44D is arranged radially inward of an outer surface of each coil guide wall 2623D. The radially inner end of each fixing member arranging portion 44D is arranged radially outward of an inner surface of each coil guide wall 2623. A lower core back insulating portion 262D includes recessed portions 2627. Each recessed portion 2627 is arranged in the vicinity of a separate one of the fixing member arranging portions 44D, and is recessed radially inward. In other words, each recessed portion 2627 is recessed radially inward so as to extend along an edge of the separate fixing member arranging portion 44D. Since both the lower insulator 26D and the stator core 23D are mass-produced products, each of the lower insulator 26D and the stator core 23D is molded with a certain dimensional tolerance. Thus, provision of the recessed portions 2627 contributes to preventing the lower core back insulating portion 262D and each fixing member arranging portion 44D from overlapping with each other in a plan view when the lower insulator 26D and the stator core 23D are fitted to each other. That is, the provision of the recessed portions 2627 contributes to preventing each screw 61D from making contact with the lower insulator 26D when the screw 61D is inserted into the corresponding fixing member arranging portion 44D. A radially inner end of each recessed portion 2627 is arranged radially outward of the inner surface of each coil guide wall 2623. This contributes to providing secure isolation between each coil 24D and the stator core 23D since the coils 24D are arranged radially inside the inner surfaces of the coil guide walls 2623.

Figure 12:
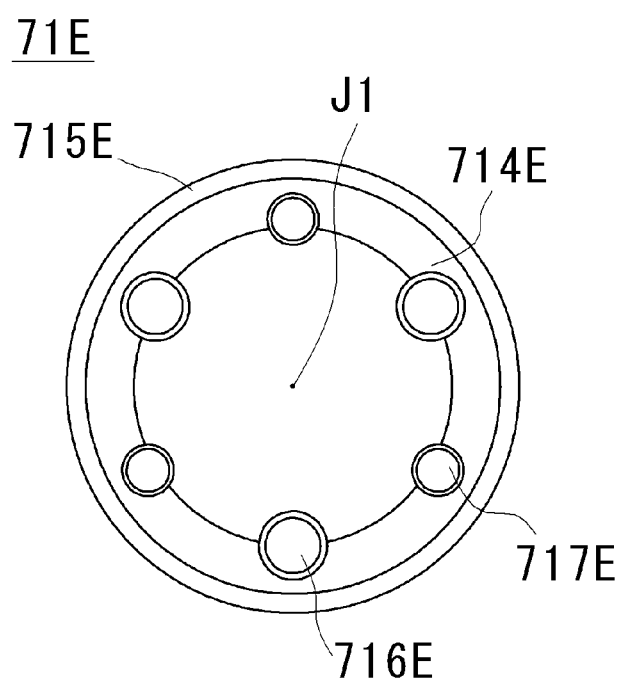
FIG. 12 is a plan view of a cover member according to a preferred embodiment of the present invention.

FIG. 12 is a diagram illustrating a cover member 71E according to another preferred embodiment of the present invention. The cover member 71E is applicable to the above-described preferred embodiment. Referring to FIG. 12, the cover member 71E preferably includes an annular portion 714E, an outer circumferential portion 715E, and accommodating portions 716E and 717E. The cover member 71E according to the present preferred embodiment is preferably made of, for example, a resin. Note that the cover member 71E may alternatively be made of rubber. The annular portion 714E is preferably in the shape of a doughnut-shaped disk, and is configured to join the accommodating portions 716E and 717E to one another. The outer circumferential portion 715E is arranged radially outside the annular portion 714E. The outer circumferential portion 715E is cylindrical in shape. The cover member 71E according to the present preferred embodiment is preferably, for example, press fitted into and fixed to the lower projecting portion 223 of the lower bracket 22.

Each of the accommodating portions 716E and 717E includes a bottom and is cylindrical or substantially cylindrical in shape. The circumferential positions of the accommodating portions 716E and 717E are configured to coincide with those of the opening portions 228 of the lower bracket 22. In the present preferred embodiment, the accommodating portions 716E are arranged at three circumferential positions symmetrically with respect to a point, and the accommodating portions 717E are also arranged at three circumferential positions symmetrically with respect to the point. In addition, the radial position of each of the accommodating portions 716E and 717E is configured to coincide with that of each of the opening portions 228 of the lower bracket 22. Each of the accommodating portions 716E and 717E is configured to open toward a separate one of the opening portions 228. Accordingly, when the screws are inserted through the opening portions 228, the screws are accommodated in the accommodating portions 716E and 717E. Thus, intrusion of dust into the interior of the motor is reliably prevented. Here, the circumferential position of each of the accommodating portions 716E and 717E is arranged between the circumferential positions of adjacent ones of the magnetic pole teeth 232 of the stator core 23. Moreover, the axial position of the bottom of each of the accommodating portions 716E and 717E is arranged on a side of the axial position of the annular portion 714E closer to the stator core 23. This arrangement contributes to increasing the length of the screw inserted through each opening portion 228.

While the motor according to the above-described preferred embodiment is preferably a three-phase brushless motor, this is not essential to the present invention. Motors according to other preferred embodiments of the present invention may be single-phase or two-phase brushless motors, brushed motors including brushes and commutators, or other types of motors, such as stepping motors.

Note that, although each of the upper and lower projecting portions according to the above-described preferred embodiment preferably is annular or substantially annular in shape, this is not essential to the present invention. Each of the upper and lower projecting portions may be in another shape. For example, each of the upper and lower projecting portions may be defined by a plurality of plate-shaped portions.

Also note that, although the upper bracket 21 according to the above-described preferred embodiment is preferably shaped such that the upper bearing is arranged in the central opening portion, this is not essential to the present invention.

Also note that an object to be rotated may be fixed to either an upper portion or a lower portion of the shaft 31, and that objects to be rotated may be fixed to both the upper and lower portions of the shaft 31. Also note that the upper insulator 25 and the lower insulator 26 may be reversed.

Also note that features of the above-described preferred embodiments and the modifications thereof may be combined appropriately as long as no conflict arises.

Various preferred embodiments of the present invention are applicable to inner-rotor motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor comprising:
a bearing portion including an upper bearing and a lower bearing;
a shaft including a central axis extending in a vertical direction as a center thereof, and rotatably supported by the bearing portion;
a rotor magnet configured to rotate together with the shaft;
an armature located radially outside the rotor magnet; and
a casing configured to fix the armature and hold the upper and lower bearings at a radial center thereof, each of the upper bearing and the lower bearing being configured to rotatably support the shaft; wherein the armature includes:
- a stator core including an annular core back and a plurality of magnetic pole teeth that project radially inward from the core back;
- an insulator that covers at least an upper surface and a lower surface of each of the plurality of magnetic pole teeth of the stator core;
- coils, each of the coils being defined by a conducting wire wound around a separate one of the plurality of magnetic pole teeth with the insulator intervening therebetween; and
- passage lines located circumferentially between adjacent ones of the plurality of magnetic pole teeth to electrically connect one of the coils and another one of the coils with each other;

the insulator includes:
- magnetic pole tooth insulating portions that each cover a separate one of the plurality of magnetic pole teeth; and
- a core back insulating portion integral with each of the plurality of magnetic pole tooth insulating portions, the core back insulating portion covering at least a portion of an upper end surface and a portion of a lower end surface of the core back;

the core back insulating portion includes:
- a plurality of passage line guide walls, each of the plurality of passage line guide walls projecting in an axial direction away from a surface of core back insulating portion covering the core back;
- a plurality of passage line holding portions, each of the plurality of passage line holding portions projecting in the axial direction away from the surface covering the core back, and each of the plurality of passage line holding portions supporting at least one of the passage lines with a radially outer surface thereof radially inside a separate one of the passage line guide walls; and
- a plurality of coil guide walls, each of the plurality of coil guide walls projecting in the axial direction away from the surface covering the core back, and each of the plurality of coil guide walls are radially opposite a radially outer side of a corresponding one of the coils radially outside a corresponding one of the plurality of magnetic pole teeth; and an upper end of a portion of each of the plurality of passage line guide walls that is radially opposed to a corresponding one of the passage line holding portions is located at an axial level lower than an axial level of an upper end of the corresponding passage line holding portion.

2. The motor according to claim 1, wherein each of the plurality of coil guide walls is located radially inward of each of the plurality of passage line guide walls.

3. The motor according to claim 1, wherein the core back insulating portion further includes a plurality of joining walls, each of the plurality of joining walls projects in the axial direction away from the surface covering the core back, and each of the plurality of joining walls join an adjacent one of the plurality of passage line guide walls and an adjacent one of the plurality of coil guide walls to each other.

4. The motor according to claim 1, wherein the upper end of each of the plurality of passage line holding portions is located at an axial level lower than an axial level of an upper end of each of the plurality of coil guide walls.

5. The motor according to claim 1, wherein circumferential ends of each of the plurality of passage line holding portions includes a slanting surface that obliquely extends in a circumferential direction away from a middle of the plurality of passage line holding portions.

6. The motor according to claim 1, wherein an inner surface of each of the plurality of coil guide walls is radially inward of an outer surface of each of the plurality of passage line holding portions.

7. The motor according to claim 1, wherein each of the magnetic pole tooth insulating portions includes a plate portion that projects upward and is radially opposite to an inner end of a corresponding one of the coils.

8. The motor according to claim 7, wherein an upper end of the plate portion is located at an axial level higher than an axial level of the upper end of each of the plurality of passage line holding portions.

9. The motor according to claim 1, wherein a ratio of a width of a radial gap between each of the plurality of passage line guide walls and a corresponding one of the plurality of passage line holding portions to a height of the plurality of passage line holding portions is equal to or less than 1 to 3.

10. The motor according to claim 1, further comprising a cover member, wherein
the casing includes an opening portion defined by a through hole passing through an axial end surface of the casing in the axial direction; and
the cover member is opposite to the opening portion between the casing and the armature.

11. The motor according to claim 1, wherein the casing includes an upper bracket that holds the upper bearing, and a lower bracket that holds the lower bearing.

12. The motor according to claim 11, wherein at least one of the upper bracket and the lower bracket is press fit to an outer circumferential surface of the stator core.

* * * * *